(12) United States Patent
Zia et al.

(10) Patent No.: US 6,494,199 B1
(45) Date of Patent: Dec. 17, 2002

(54) MULTIPOISE FURNACE CABINET

(75) Inventors: Ninev Karl Zia, Indianapolis, IN (US); Rex Mills, Indianapolis, IN (US); Merle Dana Sears, Mooresville, IN (US); Robert C. Swilik, Jr., Indianapolis, IN (US); James K. Beerbower, Brownsburg, IN (US); Brian A. Reeves, West Point, IN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/982,479

(22) Filed: Oct. 18, 2001

(51) Int. Cl.$^7$ .................................. F24C 3/00
(52) U.S. Cl. .................. 126/110 R; 126/114; 126/99 R
(58) Field of Search .............................. 110/181, 173 C, 110/173 R, 172; 454/275; 220/203.25, 271, 366.1, 367.1; 126/37 R, 37 A, 37 B, 110 R, 114, 190, 198, 197, 116 R; 52/98, 100, 220.8

(56) References Cited

U.S. PATENT DOCUMENTS

| | | | | |
|---|---|---|---|---|
| 2,110,841 A | * | 3/1938 | Maier | 220/80 |
| 2,508,818 A | * | 5/1950 | Figg | 126/277 |
| 2,540,877 A | * | 2/1951 | Harvey | 126/93 |
| 4,279,454 A | * | 7/1981 | Koiso et al. | 312/297 |
| 4,466,676 A | * | 8/1984 | Nilsson | 312/283 |
| 5,322,051 A | * | 6/1994 | Patterson et al. | 126/110 R |
| 5,377,662 A | * | 1/1995 | Mills et al. | 126/110 R |
| 5,749,355 A | * | 5/1998 | Roan et al. | 126/110 R |
| 5,775,318 A | * | 7/1998 | Haydock et al. | 126/110 R |
| 5,964,659 A | * | 10/1999 | Hertzler et al. | 454/253 |
| 6,152,551 A | * | 11/2000 | Annas | 312/224 |
| 6,182,612 B1 | * | 2/2001 | Ross | 119/482 |

\* cited by examiner

Primary Examiner—Ira S. Lazarus
Assistant Examiner—K. B. Rinehart
(74) Attorney, Agent, or Firm—Wall Marjama & Bilinski LLP

(57) ABSTRACT

A multipoise furnace cabinet includes right and left sides with top and bottom plates connecting upper and lower parts of the right and left sides together. In one embodiment, top and bottom plates include vent cutouts. A side of the top plate has a first partially cut section that aligns with a second partially cut section in a door to the furnace cabinet, wherein the first and second partially cut sections substantially describe a circle, such that when the first and second partially cut sections are removed from the door and the cabinet, a resulting opening permits entry of a flue vent pipe. Front edges of the right and left cabinet sides are flanged, as are the front edges of the top and bottom plates. In another embodiment, the vent cutouts are entirely within the door.

16 Claims, 6 Drawing Sheets

MULTIPOISE FURNACE CABINET

FIELD OF THE INVENTION

This invention relates to the field of furnaces, and in particular, to a multipoise furnace cabinet.

BACKGROUND OF THE INVENTION

The design of hot air furnaces has changed over the years. One type of furnace is designed as a multipoise furnace, that is, a furnace that can be installed in various orientations depending on whether a downflow or upflow furnace is desired, or even on its side if required by space constraints. Designing a furnace cabinet that can be installed in any of these orientations requires a multitude of changes in interoperable components. Traditionally, all furnaces in the residential market in the United States are 28" (±1") deep with the front access door being about ¾" or less deep. There has been a trend in the market over the last several years to reduce the total furnace cabinet height from 40" or more to the 30"–34" range in order to improve installation flexibility and reduce costs. Unfortunately, ease of assembly, serviceability, and accessibility to components within the furnace are degraded as the cabinet becomes smaller. A novel cabinet design is needed to provide true multipoise capability while at the same time permitting ease of installation and accessability to interior components for repair and servicing.

SUMMARY OF THE INVENTION

Briefly stated, a multipoise furnace cabinet includes right and left sides with top and bottom plates connecting upper and lower parts of the right and left sides together. In one embodiment, top and bottom plates include vent cutouts. A side of the top plate has a first partially cut section that aligns with a second partially cut section in a door to the furnace cabinet, wherein the first and second partially cut sections substantially describe a circle, such that when the first and second partially cut sections are removed from the door and the cabinet, a resulting opening permits entry of a flue vent pipe. Front edges of the right and left cabinet sides are flanged, as are the front edges of the top and bottom plates. In another embodiment, the vent cutouts are entirely within the door.

According to an embodiment of the invention, a multipoise furnace cabinet includes right and left sides; a top plate connecting a top front section of the right side to a top front section of the left side; a bottom plate connecting a bottom front section of the right side to a bottom front section of the left side; the top plate including a vent cutout; the bottom plate including a vent cutout; and a first side of the top plate having a first partially cut section that aligns with a second partially cut section in a door to the furnace cabinet wherein the first and second partially cut sections substantially describe a circle, such that when the first and second partially cut sections are removed from the door and the cabinet, a resulting opening permits entry of a flue vent pipe.

According to an embodiment of the invention, a multipoise furnace cabinet includes right and left sides; a plate top connecting a top front section of the right side to a top front section of the left side; a plate bottom connecting a bottom front section of the right side to a bottom front section of the left side; a door; wherein the door to the furnace cabinet comprises a front portion; a right side portion and a left side portion connected to the front portion; a top portion connected to the front portion; a bottom portion connected to the front portion at an opposite end from the top portion; the front portion being rectangular in shape; and at least one of the right and left side portions and the top and bottom portions including at least one cutout section contained entirely within such portion, such that when at least one cutout section is removed from the door, a resulting opening permits entry of a flue vent pipe.

DETAILED DESCRIPTION OF THE PREFERRED EMBODIMENT

The present invention is described herein relating to a preferred embodiment in accordance with the present invention. Throughout the course of discussion, such terms as "front", "back", "side", "lateral", "top", "horizontal", "vertical" and "bottom" are used. These terms are meant to serve as a frame of reference for the accompanying drawings, and are not intended to be limiting with respect to the invention, except as indicated.

Figure 1:
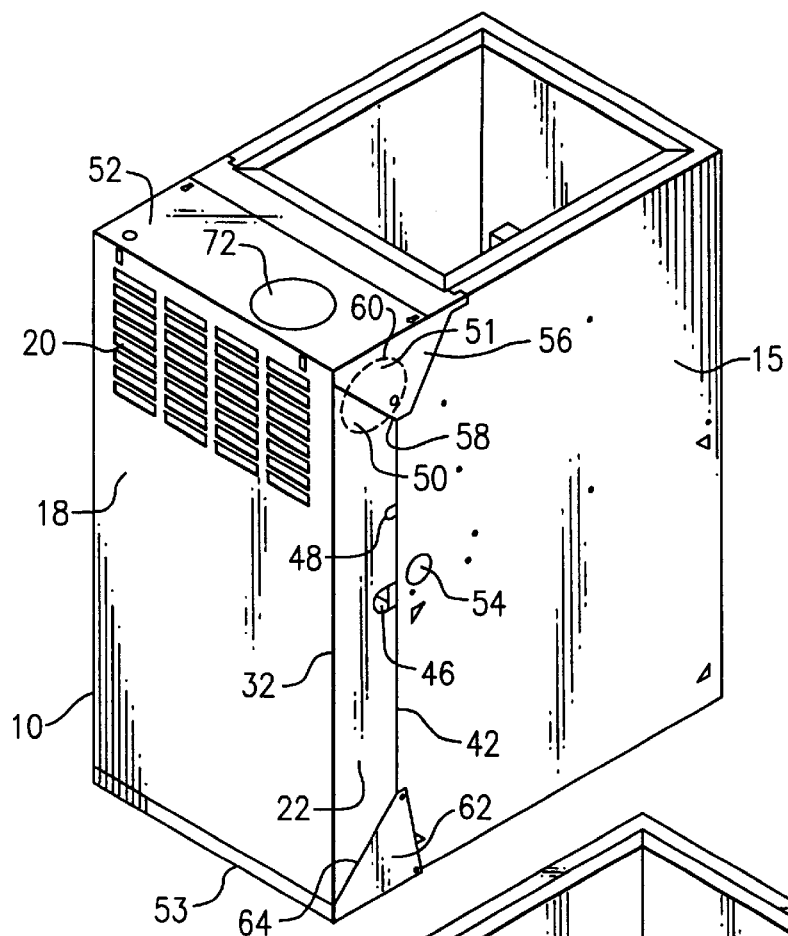
FIG. 1 shows a perspective view of a multipoise furnace cabinet according to an embodiment of the present invention.
Figure 2:
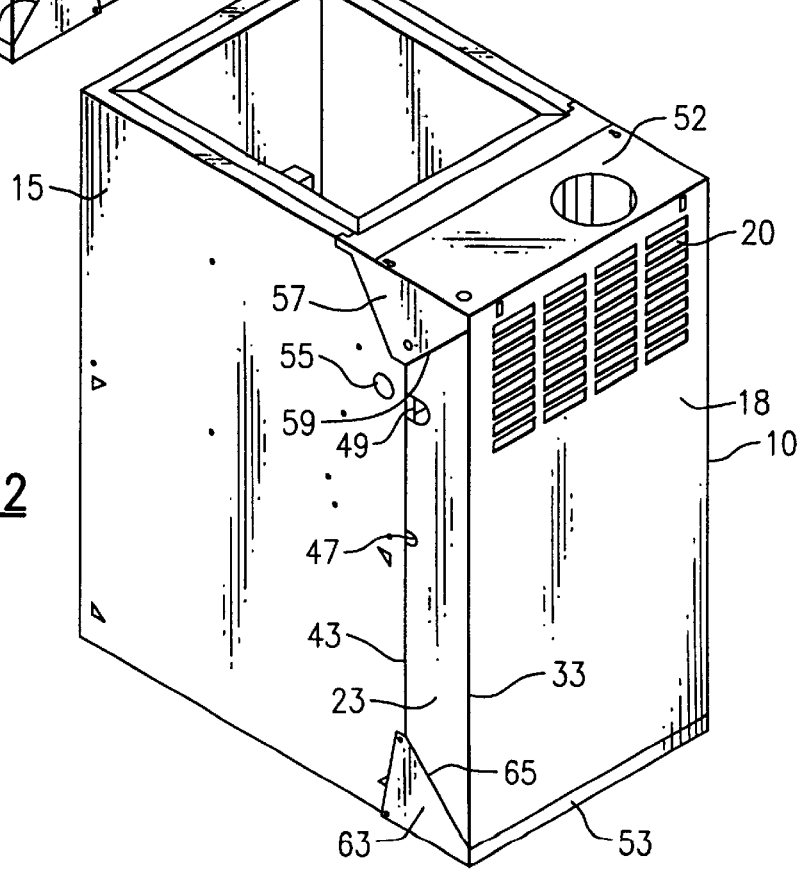
FIG. 2 shows a perspective view of a multipoise furnace cabinet according to an embodiment of the present invention.

Referring to FIGS. 1–2, a furnace cabinet door 10 fits onto a multipoise furnace cabinet 15. A plurality of ventilation holes 20 in a front portion 18 of door 10 permit normal air circulation within cabinet 15. Door 10 includes right and left side portions 22, 23 that are preferably one-piece with front portion 18. Front edges 32, 33 of right and left side portions 22, 23 are substantially parallel to rear edges 42, 43 of right and left side portions 22, 23. All the edges of right side portion 22 form a trapezoid, as do all the edges of left side portion 23.

Cabinet 15 includes a top plate 52 which extends outward from a top of a main portion of cabinet 15. Top plate 52 has right and left triangular side flaps 56, 57 so that it can be attached to the main portion of cabinet 15 along both the top and side, so it provides additional strength to the top front of cabinet 15, and so that leading edges 58, 59 of right and left side flaps 56, 57 adjoin corresponding edges of right and left portions 22, 23 of door 10. Leading edges 58, 59 preferably include a flange that is angled at 90 degrees from left and right side flaps 56, 57. Cabinet 15 also includes a bottom plate 53 which extends outward from a bottom of the main portion of cabinet 15. Bottom plate 53 has right and left triangular side flaps 62, 63 so that it can be attached to the main portion of cabinet 15 along both the top and side, so it provides additional strength to the top front of cabinet 15, and so that leading edges 64, 65 of right and left side flaps 62, 63 adjoin corresponding edges of right and left portions 22, 23 of door 10. Leading edges 64, 65 preferably include a flange that is angled at 90 degrees from left and right side flaps 62, 63.

Figure 3:
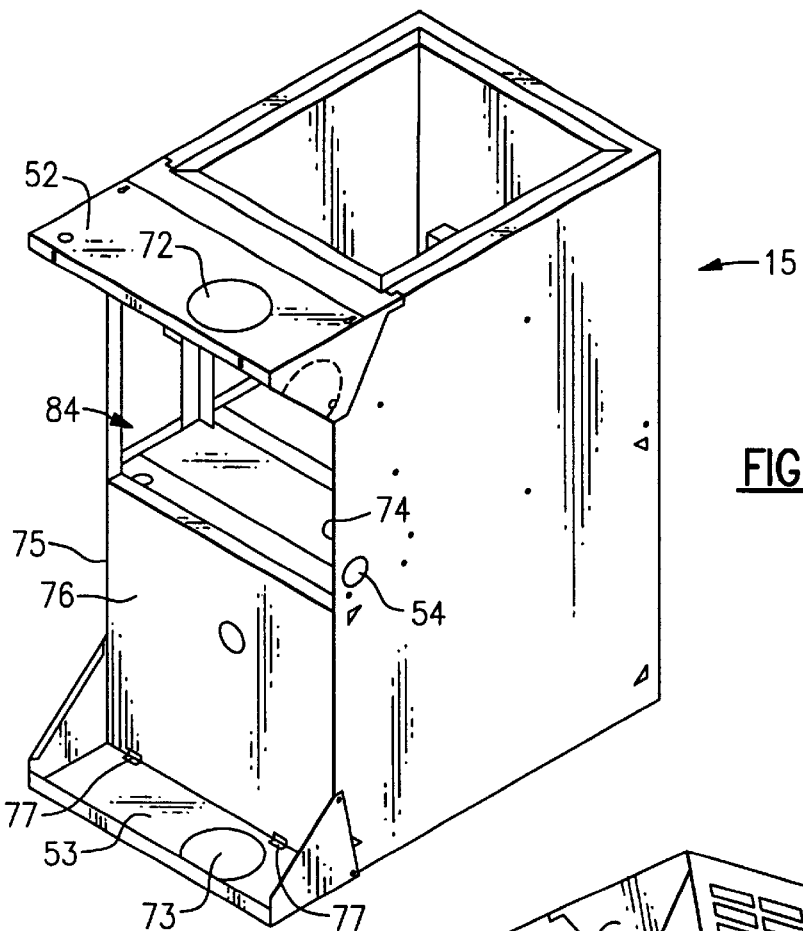
FIG. 3 shows a perspective view of a multipoise furnace cabinet with its outer door removed according to an embodiment of the present invention.

Referring also to FIG. 3, top plate 52 has a vent cutout 72 and bottom plate 53 has a vent cutout 73 to permit entry of a flue vent. In an alternate embodiment, vent cutouts 72, 73 are only partially cut, so that an installer can easily remove one or the other depending on the furnace installation and cabinet orientation.

Figure 4:
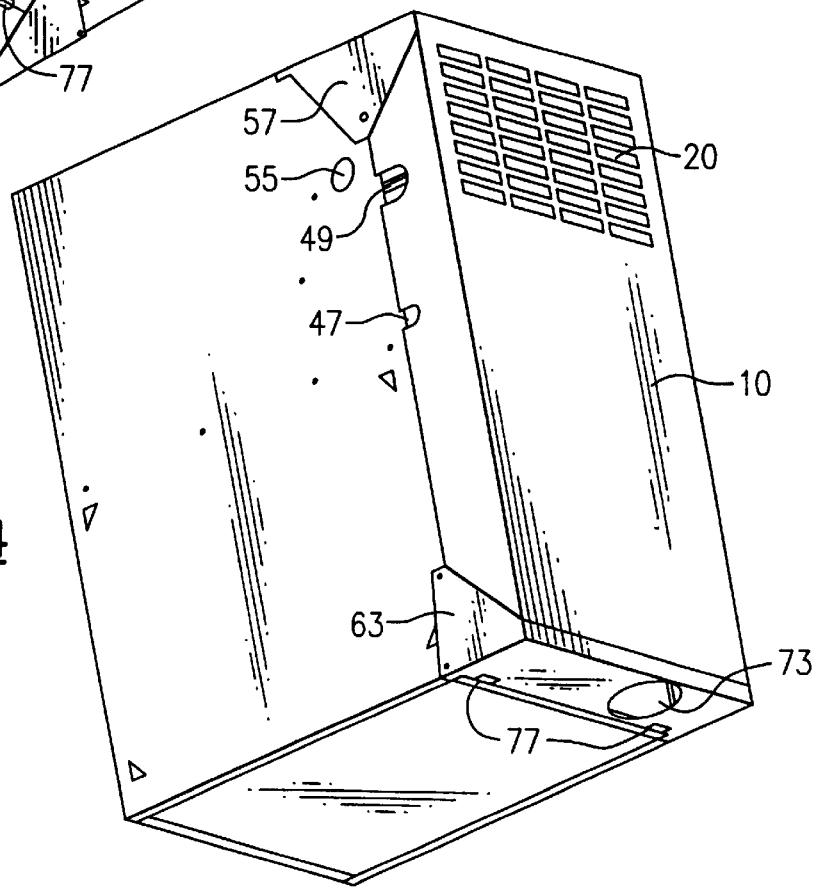
FIG. 4 shows a perspective view of a multipoise furnace cabinet according to an embodiment of the present invention.

Referring to FIGS. 3–4, front edges 74, 75 of cabinet 15 are preferably flanged to provide added strength and to permit mounting an inner door (blower door) 76 directly onto front edges 74, 75, thus enhancing blower compartment sealing. The ability to mount inner door 76 directly onto the flanged front edges 74, 75 signifies that separate mounting brackets are not needed within cabinet 15, thus increasing accessibility to the interior components of the furnace. A pair of reliefs 77 in bottom plate 53 allow insertion and retention of inner door 76.

Referring now to FIGS. 1–4, each side portion 22, 23 preferably includes at least one cutout therein, such as gas cutouts 46, 47 and power cable cutouts 48, 49. Right side portion 22 preferably includes a partially cut section 50 that, together with a partially cut section 51 in right side flap 56 of top plate 52 of cabinet 15, describes a circular partially cut section 60 which is removable to permit entry of a vent pipe. Partial cutouts 54, 55 can be punched out by the installer to permit entry of a thermostat wire. Partial cutouts 54, 55 are optionally full cutouts.

A distance between front and rear edges 32, 42 of right side portion 22 is sufficient to pass a flue vent, and preferably is about 4 inches, as is a distance between front and rear edges 33, 43 of left side portion 23. By incorporating right and left side portions 22, 23 with front portion 18 permits greater accessability to internal components within cabinet 15 when door 10 is removed. This enhanced accessability greatly aids a servicer when furnace repairs or maintenance are required.

Figure 5A:
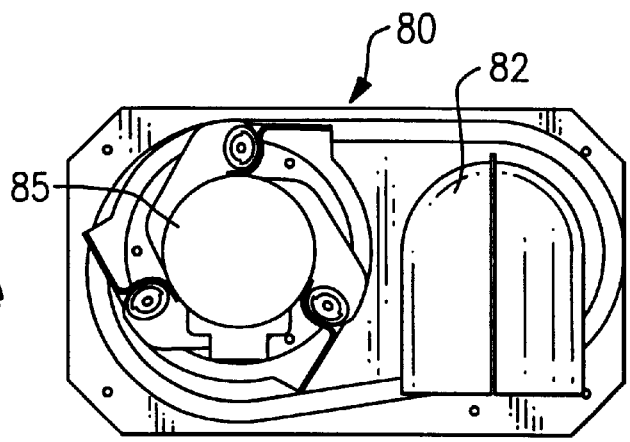
FIG. 5A depicts an orientation of a vent elbow when the furnace is in the downflow or horizontal orientation
Figure 5B:
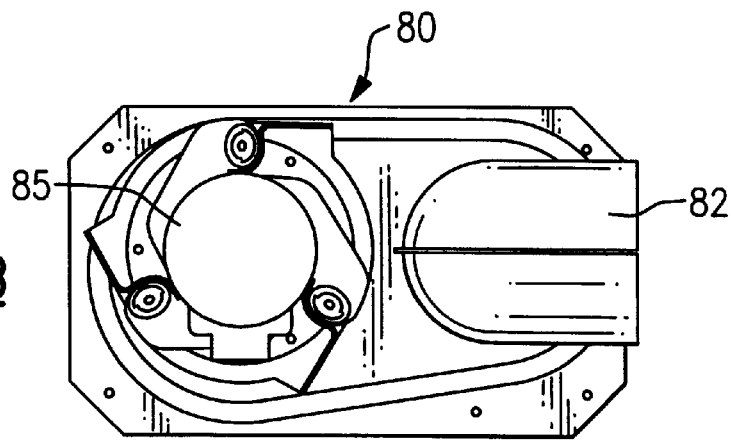
FIG. 5B depicts the orientation of the vent elbow when the furnace is in the horizontal left side down side discharge, upflow, or downflow orientation.
Figure 5C:
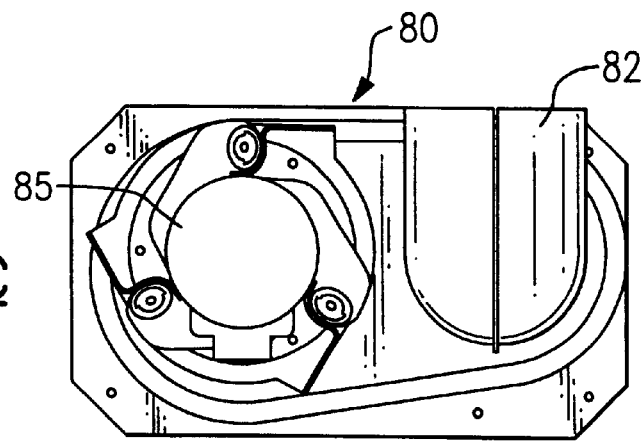
FIG. 5C depicts the orientation of the vent elbow when the furnace is in the upflow or horizontal orientation.

Referring to FIGS. 5A–5C, a draft inducer assembly 80 is shown with a vent elbow 82 adjacent a draft inducer motor cooling fan 85. Draft inducer assembly 80 is preferably installed in cabinet 15 generally at location 84 in FIG. 3. The depth of door 10 combined with vent cutouts 72, 73, and partially cut section 60 enables routing the flue vent (not shown) from draft inducer assembly 80 entirely inside cabinet 15 no matter what the orientation of the multipoise furnace is. FIG. 5A depicts the orientation of vent elbow 82 when the furnace is in the downflow or horizontal orientation. FIG. 5B depicts the orientation of vent elbow 82 when the furnace is in the horizontal left side down side discharge, upflow, or downflow orientation. FIG. 5C depicts the orientation of vent elbow 82 when the furnace is in the upflow or horizontal orientation. The vent elbow 82 orientations correspond to the locations of vent cutout 73, partially cut section 60, and vent cutout 72, respectively.

Figure 6:
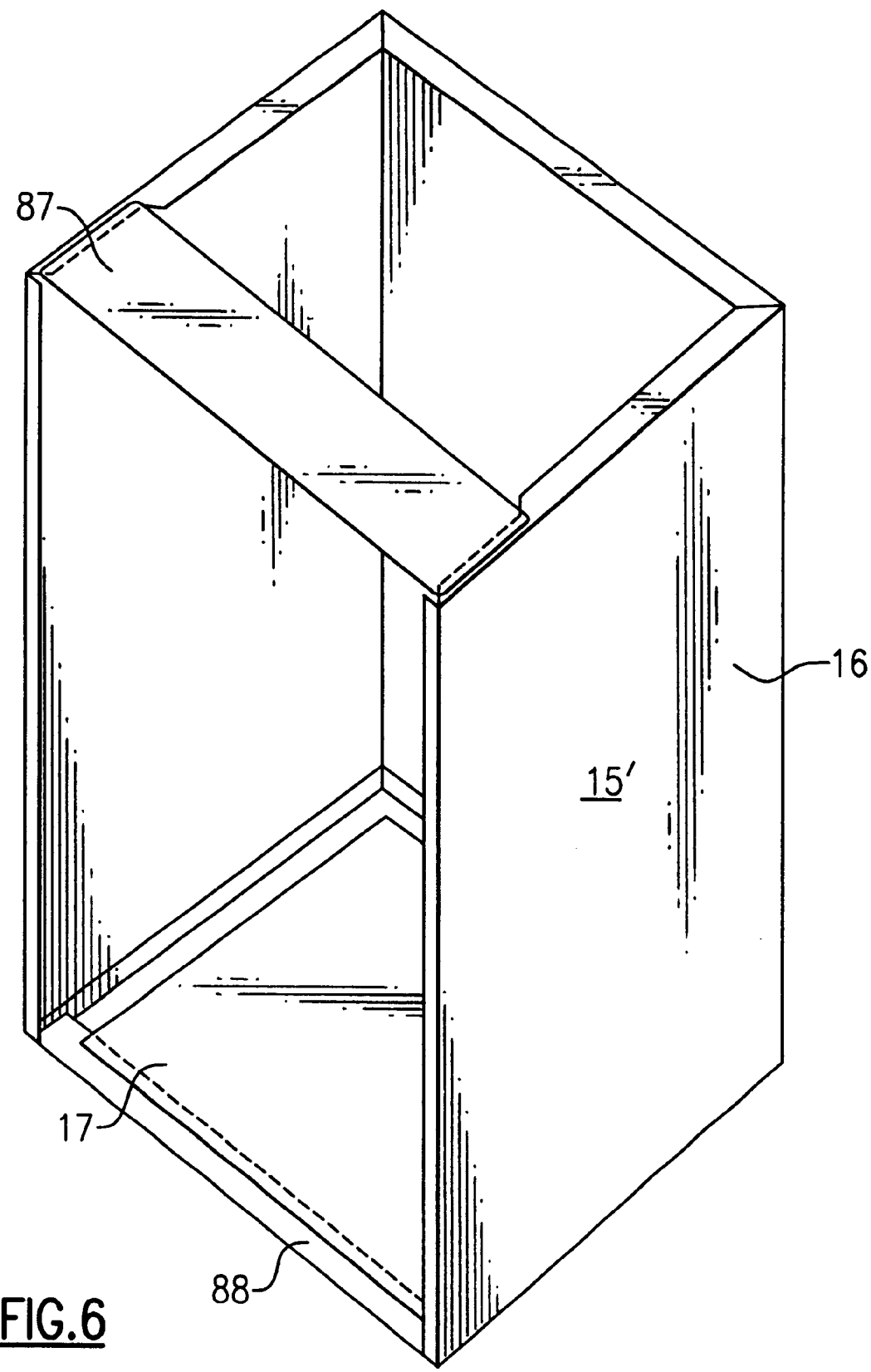
FIG. 6 shows a perspective view of part of a multipoise furnace cabinet according to an embodiment of the present invention.
Figure 7:
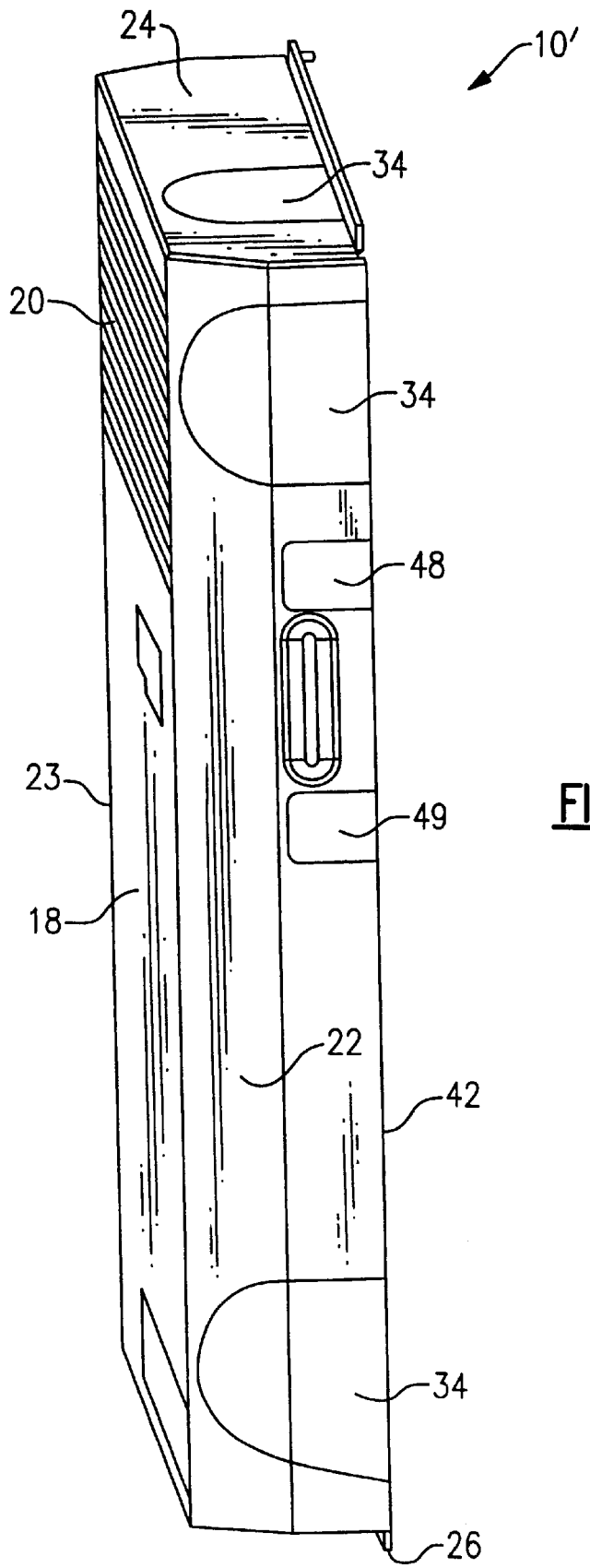
FIG. 7 shows a perspective view of a door for the embodiment shown in FIG. 6.
Figure 8:
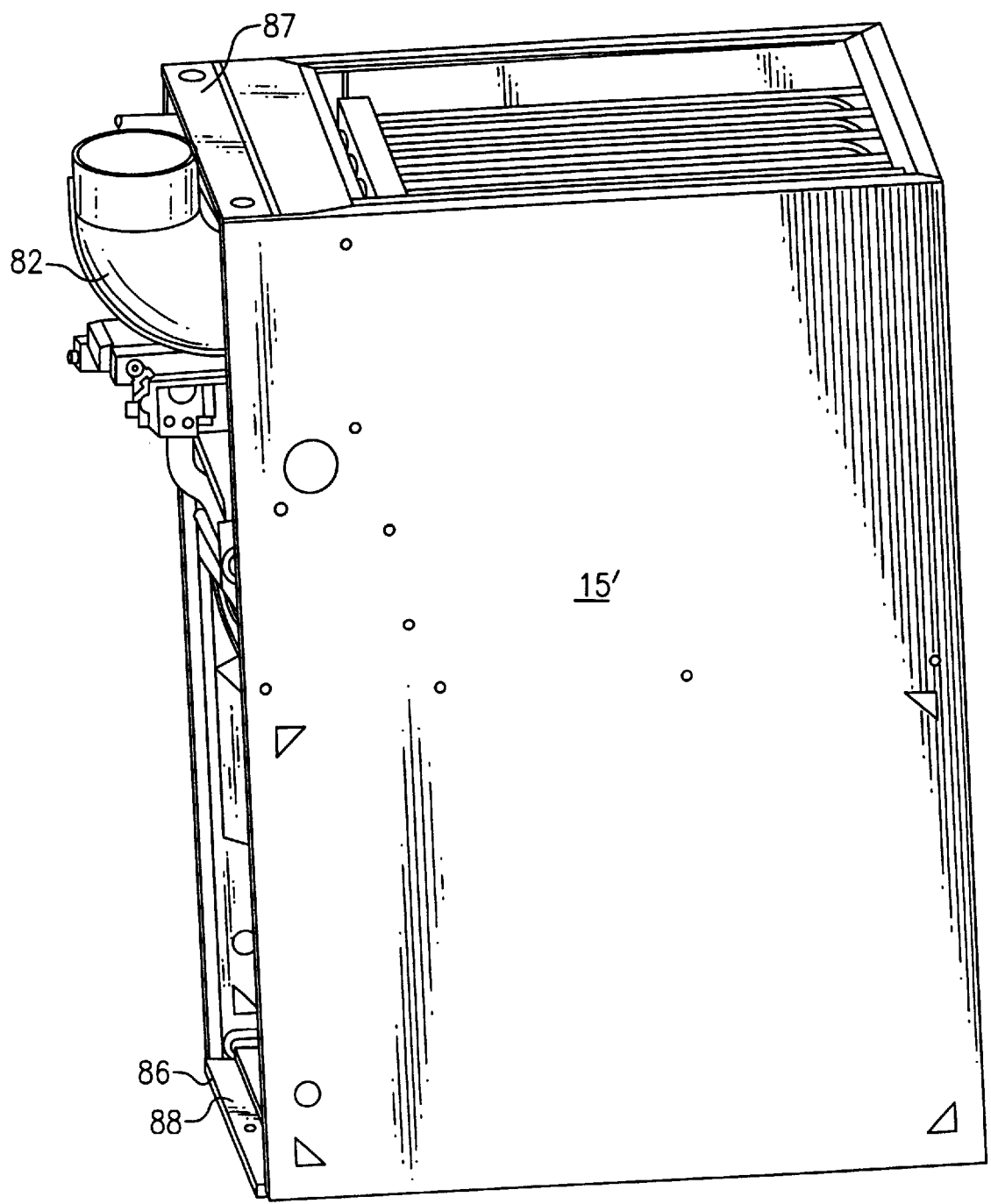
FIG. 8 shows a perspective view of the multipoise furnace cabinet of FIG. 6 with its outer door removed according to an embodiment of the present invention.

Referring to FIGS. 6–8, another embodiment is shown, for which the door is described in detail in U.S. patent application Ser. No. 09/696,369, filed on Oct. 25, 2000 and entitled "DOOR FOR FURNACE CABINET", incorporated herein by reference.

A cabinet 15' includes a 3-sided casing 16 which is secured at the top by a plate top 87 and at the bottom by a plate bottom 88. A bottom closure 17 provides additional support. A door 10' (FIG. 7) includes a plurality of ventilation holes 20, a rectangular front portion 18, a rectangular top portion 24, and two rectangular side portions 22, 23. A rear edge 42 of door 10' fits against a front edge of casing 16 when door 10' is fitted on cabinet 15'. A flange 26 fits over a flange 86 in plate bottom 88.

Each side portion 22, 23 preferably includes at least one cutout therein, such as power cable cutouts 48, 49. Right side portions 22, 23, a bottom portion (not shown), and top portion 24 preferably include at least one cutout 34 which is removable to permit entry of a vent pipe (not shown) which attaches to a rotatable vent elbow 82. Unlike the embodiment shown in FIGS. 1–4, each cutout 34 is entirely within door 10'. The additional width of side portions 22, 23 which permits each cutout 34 to be entirely within of side portions 22, 23 also permits side access to internal furnace components during servicing. Depending on the type of furnace, which determines the diameter of the associated vent pipe, the width of side portions 22, 23 can be in the range from two to six inches. The term "cutout" as used in the specification and claims refers to a cutout, knockout, and/or plug as those terms are known to those skilled in the art. FIGS. 5A–5C show the various orientations of vent elbow 82 that are possible, depending on what position the furnace is installed in.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A multipoise furnace cabinet, comprising:

right and left sides;

a top plate connecting a top front section of said right side to a top front section of said left side;

a bottom plate connecting a bottom front section of said right side to a bottom front section of said left side;

said top plate including a vent cutout;

said bottom plate including a vent cutout; and a first side of said top plate having a first partially cut section that aligns with a second partially cut section in a door to said furnace cabinet wherein said first and second partially cut sections substantially describe a circle, such that when said first and second partially cut sections are removed from said door and said cabinet, a resulting opening permits entry of a flue vent pipe.

2. A cabinet according to claim 1, wherein:

said top plate includes a second side, said first and second sides being triangularly shaped, said first and second sides being connected to said right and left sides of said cabinet at at least two locations; and said bottom plate includes first and second sides, said first and second sides being triangularly shaped, said first and second sides being connected to said right and left sides of said cabinet at at least two locations.

3. A cabinet according to claim 1, wherein:
a front edge of said right side is flanged;
a front edge of said left side is flanged;
a front edge of said top plate is flanged; and
a front edge of said bottom plate is flanged.

4. A cabinet according to claim 3, wherein at least one of said right and left sides includes a partial cutout.

5. A cabinet according to claim 1, wherein said bottom plate includes a plurality of reliefs therein disposed such that a bottom of an inner door positioned against said front edges of said right and left sides is retained by said plurality of reliefs.

6. A cabinet according to claim 1, wherein said door to said furnace cabinet comprises:
a front portion;
right and left side portions connected to said front portion;
said right side portion having a front edge, a rear edge, a top edge, and a bottom edge, wherein said front edge, said rear edge, said top edge, and said bottom edge form a trapezoid with said front edge and said rear edge being substantially parallel; and
said left side portion having a front edge, a rear edge, a top edge, and a bottom edge, wherein said front edge, said rear edge, said top edge, and said bottom edge form a trapezoid with said front edge and said rear edge being substantially parallel.

7. A cabinet according to claim 6, wherein at least one of said right and left side portions of said door includes at least one cutout therein.

8. A cabinet according to claim 7, wherein said right side portion of said door has a power cable cutout therein and a gas pipe cutout therein and said left side portion of said door has a power cable cutout therein and a gas pipe cutout therein.

9. A cabinet according to claim 8, wherein a distance between said front edge and said rear edge of said right side portion is in a range between two to six inches and a distance between said front edge and said rear edge of said left side portion is in a range between two to six inches.

10. A cabinet according to claim 8, wherein a distance between said front edge and said rear edge of said right side portion and a distance between said front edge and said rear edge of said left side portion permits a flue vent to pass inside said cabinet from a draft inducer assembly to one of said vent cutouts.

11. A cabinet according to claim 10, wherein:
said top plate includes a second side, said first and second sides being triangularly shaped, said first and second sides being connected to said right and left sides of said cabinet at at least two locations;
said bottom plate includes first and second sides, said first and second sides being triangularly shaped, said first and second sides being connected to said right and left sides of said cabinet at at least two locations;
a front edge of said right side is flanged;
a front edge of said left side is flanged;
a front edge of said top plate is flanged;
a front edge of said bottom plate is flanged;
said right side includes a partial cutout;
said left side includes a partial cutout; and
said bottom plate includes a plurality of reliefs therein disposed such that a bottom of an inner door positioned against said front edges of said right and left sides is retained by said plurality of reliefs.

12. A multipoise furnace cabinet, comprising:
right and left sides;
a plate top connecting a top front section of said right side to a top front section of said left side;
a plate bottom connecting a bottom front section of said right side to a bottom front section of said left side;
a door; wherein said door to said furnace cabinet comprises a front portion;
a right side portion and a left side portion connected to said front portion;
a top portion connected to said front portion;
a bottom portion connected to said front portion at an opposite end from said top portion;
said front portion being rectangular in shape; and
at least one of said right and left side portions and said top and bottom portions including at least one cutout section contained entirely within such portion, such that when at least one cutout section is removed from said door, a resulting opening permits entry of a flue vent pipe;
wherein a width of said right and left side portions of said door is effective to permit said flue vent pipe to pass inside said cabinet from a draft inducer assembly to one of said cutout sections.

13. A cabinet according to claim 12, wherein said width of said right and left portions is in a range from 2 to 6 inches.

14. A cabinet according to claim 12, wherein said plate bottom includes a flange that interconnects with a flange on a bottom of said door.

15. A cabinet according to claim 12, wherein said right and left side portions and said top and bottom portions of said door are substantially rectangular in shape.

16. A multipoise furnace cabinet, comprising:
right and left sides;
a plate top connecting a top front section of said right side to a top front section of said left side;
a plate bottom connecting a bottom front section of said right side to a bottom front section of said left side;
a door; wherein said door to said furnace cabinet comprises
a front portion;
a right side portion and a left side portion connected to said front portion;
a top portion connected to said front portion;
a bottom portion connected to said front portion at an opposite end from said top portion;
said front portion being rectangular in shape; and
at least one of said right and left side portions and said top and bottom portions including at least one cutout section contained entirely within such portion, such that when at least one cutout section is removed from said door, a resulting opening permits entry of a flue vent pipe;
wherein a furnace is installed in said cabinet, and said furnace includes a rotatable flue vent which is positionable to receive said flue vent pipe passing through one of said cutout sections.

* * * * *